(12) United States Patent
Paxton et al.

(10) Patent No.: US 6,444,951 B1
(45) Date of Patent: Sep. 3, 2002

(54) WELDING ROD EXTENDING ASSEMBLY FOR ATTACHMENT WITH ELECTRODE HOLDER

(75) Inventors: Gerald E. Paxton, Hampton; George I. Sporbert, Lanexa; Gregory L. Charron, Newport News; Nathan R. Hord, Portsmouth; Fulton L. Purdy, Hayes, all of VA (US)

(73) Assignee: Newport News Shipbuilding, Newport News, VA (US)

( * ) Notice: Subject to any disclaimer, the term of this patent is extended or adjusted under 35 U.S.C. 154(b) by 0 days.

(21) Appl. No.: 09/785,506

(22) Filed: Feb. 20, 2001

(51) Int. Cl.[7] .................................................. B23K 9/28
(52) U.S. Cl. ........................................ 219/138; 219/136
(58) Field of Search ................................. 219/144, 138, 219/136, 142, 127

(56) References Cited

U.S. PATENT DOCUMENTS

| | | | |
|---|---|---|---|
| 2,324,924 A | | 2/1943 | Hall |
| 2,498,241 A | * | 2/1950 | Bowen ................... 219/137 R |
| 3,219,793 A | * | 11/1965 | Mahoney ................... 219/144 |
| 4,194,107 A | | 3/1980 | Klasson |
| 4,555,615 A | | 11/1985 | Yasuda et al. |
| 4,588,252 A | | 5/1986 | Ice |
| 4,956,540 A | * | 9/1990 | Kohno et al. ................ 219/127 |
| 6,172,334 B1 | * | 1/2001 | Harris et al. ................. 219/127 |

* cited by examiner

*Primary Examiner*—Clifford C. Shaw
(74) *Attorney, Agent, or Firm*—Hunton & Williams

(57) ABSTRACT

A welding rod extender is provided for extending an arc welding rod. The welding rod extender comprises an elongated member having a first end and a second end, the first end being adapted for connection with an electrode holder. A housing is provided having a first connecting end shaped for receiving the second end of the elongated member. The housing includes a tip having an opening shaped for receiving a welding rod. A collet is provided for connecting the receiver and the tip to the welding rod. Turning the tip in a first direction tightens the collet onto the welding rod and turning the tip in a second direction allows removal of the welding rod. The welding rod extender is provided that can easily be manipulated to reach a work piece which may not be easily accessible.

29 Claims, 6 Drawing Sheets

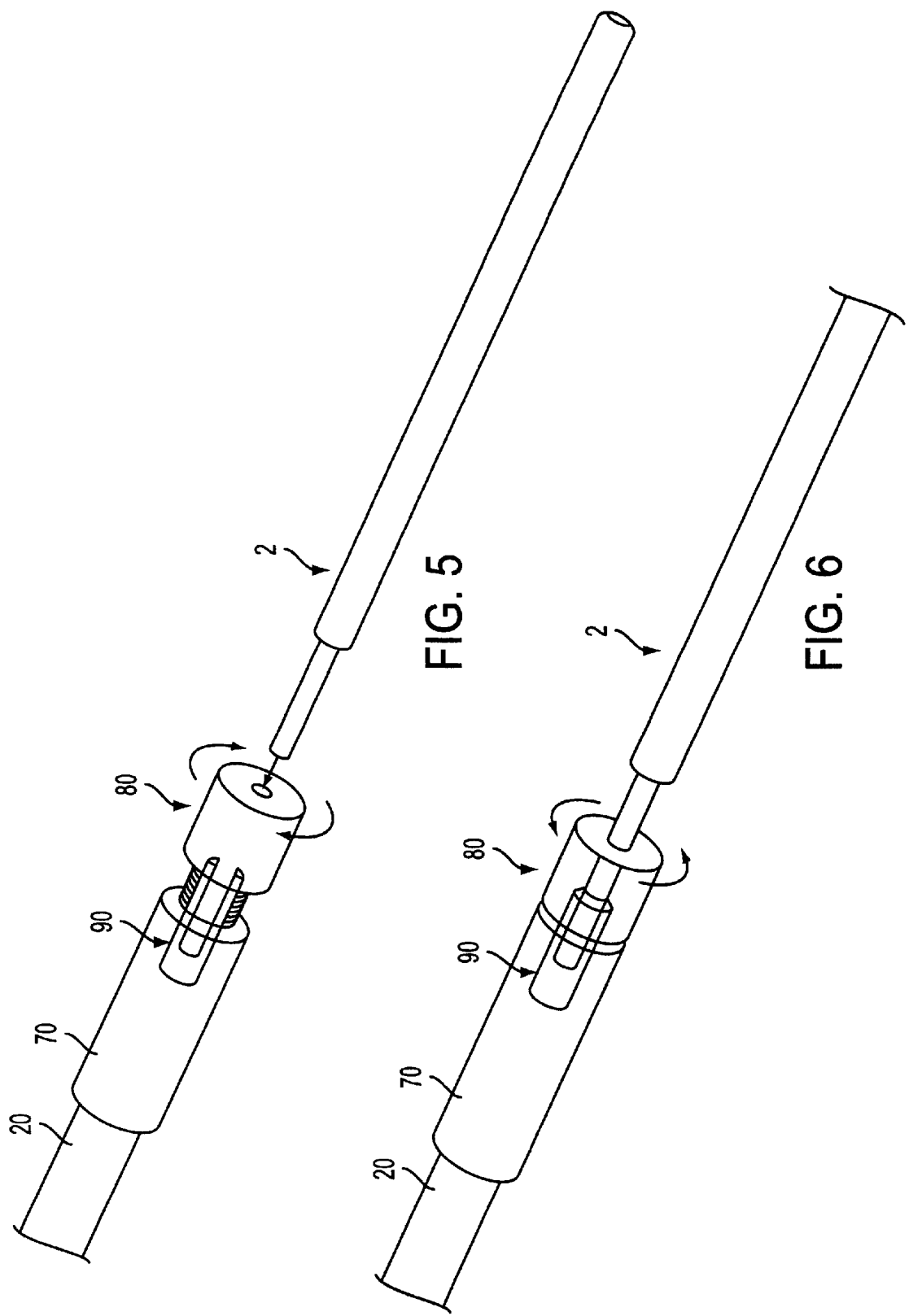

WELDING ROD EXTENDING ASSEMBLY FOR ATTACHMENT WITH ELECTRODE HOLDER

FIELD OF THE INVENTION

The invention relates to the field of welding, and in particular to supporting a welding rod during shielded metal arc welding (SMAW).

BACKGROUND OF THE INVENTION

SMAW is a welding method that uses a consumable stick electrode as a welding rod. An arc is struck between the consumable stick electrode and the base metal. A protective gas and a slag layer are generated around the welding zone, protecting the molten weld metal from oxidation such that a sound joint can be formed. Typically, the consumable stick electrode is inserted in an electrode holder which is manipulated by a user. This general structure is shown in FIG. 3, in which a consumable electrode 2 is mounted in an electrode holder 10.

Various problems have arisen in connection with this SMAW technique. The problems include waste of unused electrode material and difficulty of manipulation of the electrode holders.

Because of the high heat generated during the SMAW process, the consumable stick electrode can only be consumed such that a substantial distance remains between the electrode holder and the electrode tip. The distance between the user's hand and the tip of the electrode must be sufficient to protect the user and the electrode holder from the high temperatures generated during the SMAW process. Accordingly, a portion of the welding rod is always wasted.

Additionally, when welding must be performed within a small area, manipulation of the electrode holder to arrive at the proper portion of the work piece can become difficult if not impossible.

Furthermore, it is often difficult to insert and remove electrodes from the provided holders.

Various solutions have been proposed to overcome the aforementioned problems. U.S. Pat. No. 2,324,924 to Hall discloses an electrode holder 10 having a pivotable clamping jaw 18 which enables movement of the electrode 44 to various angular positions.

Another proposed method for overcoming difficulties associated with welding in small or not easily accessible area involves securing the electrode holder to an extension member, such as an elongated pole (such as that used in a broomstick), to allow manipulation of the electrode holder from outside the small or inaccessible area. There are several problems associated with this proposed method (or solution). Since there is no standard tool available, the user (i.e., the welder) must spend valuable time locating and attaching the elongated pole to the electrode holder each time a need arises. Extending the entire electrode holder, including the electrode connected to it, provides the welder with an unnecessarily heavy, often bulky, and uncomfortable tool which he now must use in his work. The heavy weight of the resulting tool increases the potential for arcing outside the weld joint and so called "stub-outs", a condition where the welding rod end shorts out to the material being welded and freezes to that material in the rapidly cooling weld puddle.

U.S. Pat. No. 4,555,615 provides a carbon rod assembly comprising at least to rods, which include mating internal and external threads in successive rods. When assembled, the connected rods enable a greater portion of the rods to be consumed before reaching the critical distance between the electrode holder and the workpiece.

U.S. Pat. No. 4,588,252 discloses an electrode extension holder that enables connection of two electrodes extending in opposite directions and further enables angular adjustment of the electrodes. See FIGS. 4 and 5 of the patent.

U.S. Pat. No. 4,194,107 provides a reusable electrode holder 11 including a collet to provide an easy means for applying and removing electrode tip 12. The collet 1 includes a plurality of fingers 17 that grip a tip 12 of an electrode 10. As collet 15 is withdrawn into the interior of sleeve 20, the lower portion of the sleeve engages the fingers, forcing them to grip the electrode tip 12. To remove the tip 12, a shank portion 13 is rotated opposite sleeve 20 so that the sleeve moves upwardly over the collet.

These prior art systems suffer from various drawbacks that are addressed by the present invention. First, none of the aforementioned references provides an electrode extension separate and apart from the electrode itself or the combination of the electrode holder and the electrode connected to each other. Instead, many of the prior art references merely provide multiple connected electrodes. Although the prior art systems allow for some angular adjustment, they do not allow such adjustment without the use of manipulation of screws or tools.

These and other drawbacks of prior art welding rod extension techniques are overcome by the invention as disclosed herein in conjunction smith the preferred embodiments.

SUMMARY OF THE INVENTION

It is an object of the invention to provide a lightweight electrode extension that allows a welding rod to be easily placed and manipulated in areas that are difficult to reach.

If is a further object of the invention to provide a welding rod extension, also referred to herein as "a welding rod extender" or a "welding rod extending assembly", into which an electrode can be inserted and from which the electrode can be removed without the use of tools.

It is a further object of the invention to provide a welding rod extension that can easily be connected to and disconnected from the welding rod and the electrode holder.

These and other objects, features and advantages of the invention are achieved by providing a welding rod extender for extending an arc welding rod. The welding rod extender comprises an elongated member including a first end and a second end, the first end being adapted for connection with an electrode holder. The welding rod extender further comprises a receiver having a first connecting end and a second connecting end, the first connecting end shaped for receiving the second end of the elongated member. The welding rod extender further comprises a tip including a first end for connection with the second connecting end of the receiver and an opposite end having an opening shaped for receiving a welding rod.

The objects of the present invention are also achieved by a welding rod extender for extending an arc welding rod, the welding, rod extender comprising an elongated member including a first end and a second end, the first end being adapted for connection with an electrode holder. The welding rod extender further comprises a collet for securely holding an end of the welding rod and a housing surrounding the collet. The housing is attached to the elongated member at a first housing end, and it comprises a housing tip at a second end such that the welding rod extends from the housing tip. The housing also comprises a receiver which is attached to the housing tip by the collet.

These and other objects, features and advantages of the preferred embodiments will become apparent when the detailed description of the preferred embodiments is read in conjunction with the drawings attached hereto.

BRIEF DESCRIPTION OF DRAWINGS

The accompanying drawings, which are incorporated in and constitute part of the specification, illustrate a presently preferred embodiment of the invention, and, together with the general description given above and the detailed description of the preferred embodiments given below, serve to explain the principles of the invention.

FIG. 5 illustrates the movement of the tip and collet upon insertion of the welding rod;

FIG. 6 illustrates the movement of the tip and collet upon removal of the welding rod.

DETAILED DESCRIPTION OF PREFERRED EMBODIMENTS

Figure 1:
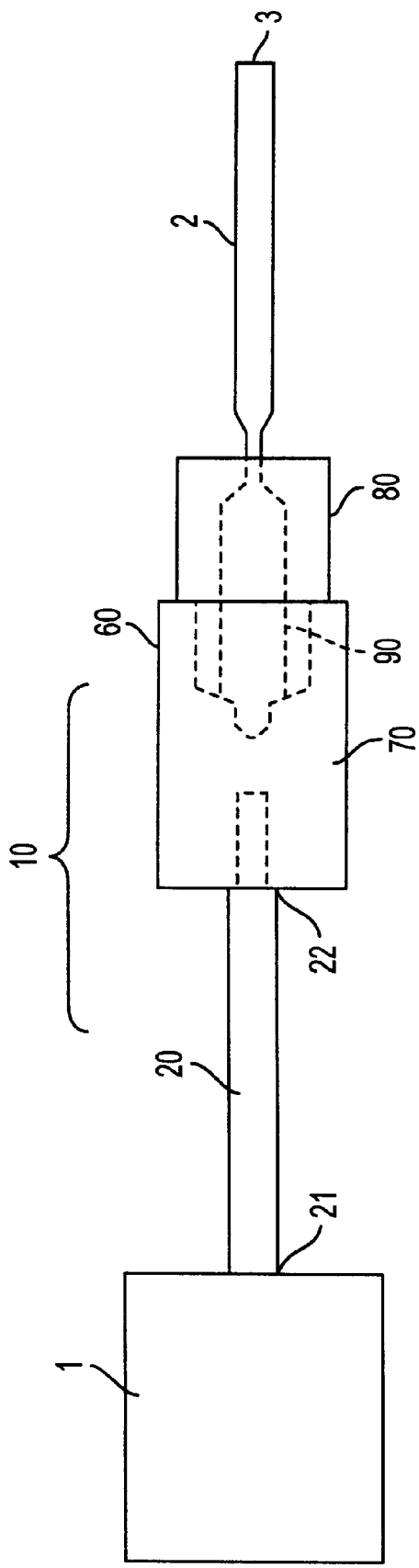
FIG. 1 is side elevation showing the components of the welding rod extender of an embodiment of the invention.

The invention of the preferred embodiments pertains to an assembly for extending a welding rod with a particular application to SMAW techniques.

Although the invention is described in connection with particularly preferred arrangements of component parts, various alternative configurations are possible within the purview of the preferred embodiments. The following preferred embodiments are illustrative only. Modifications to the preferred embodiments will be readily apparent to those skilled in the art without departing from the spirit and scope of the invention. For convenience, similar elements are designated throughout the drawing figures with the same reference numerals.

Figure 2A:
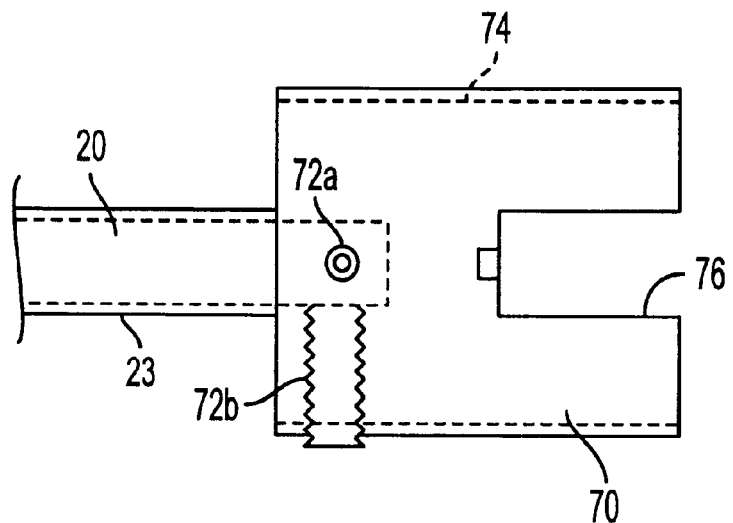
FIG. 2a is a side elevation showing an embodiment of the receiver and its connection with the wire and collet.
Figure 2B:
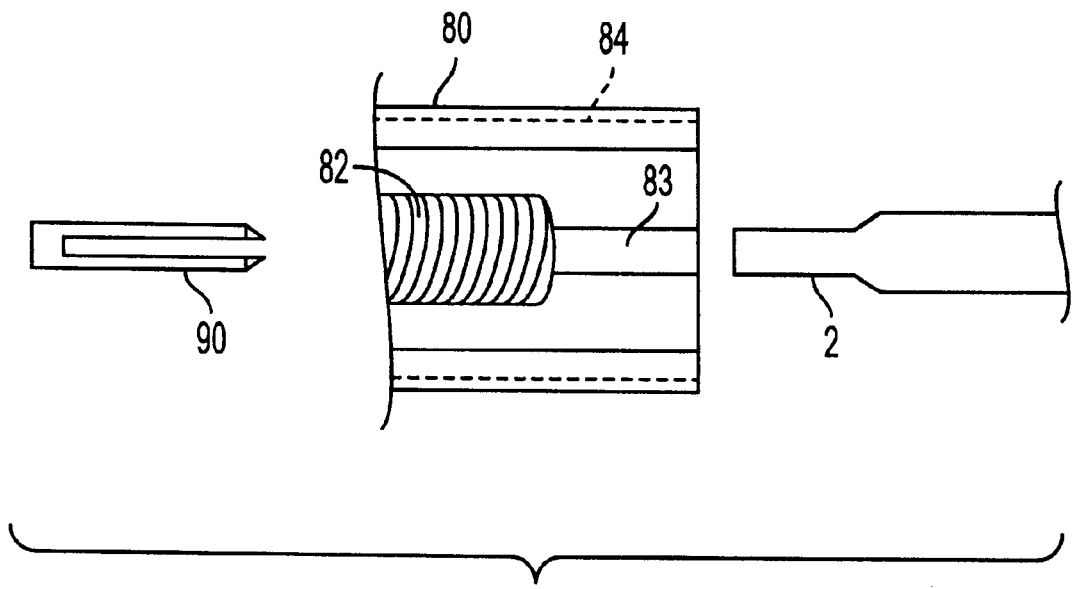
FIG. 2b is a side elevation showing an embodiment of the tip and the connection between the collet and the welding rod.
Figure 3:
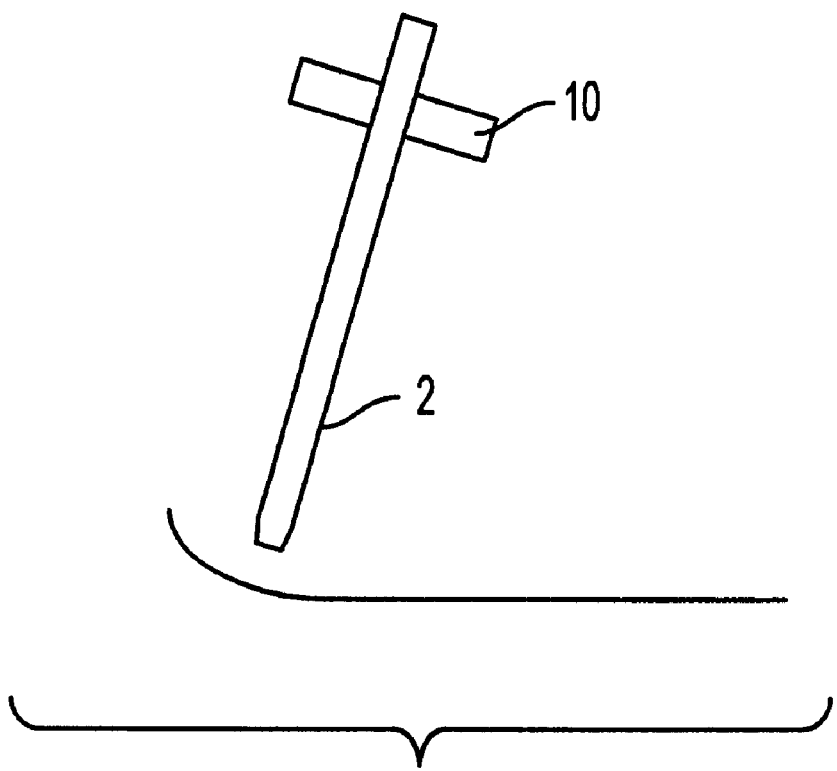
FIG. 3 is a perspective view showing a prior art configuration for SMAW.
Figure 4:
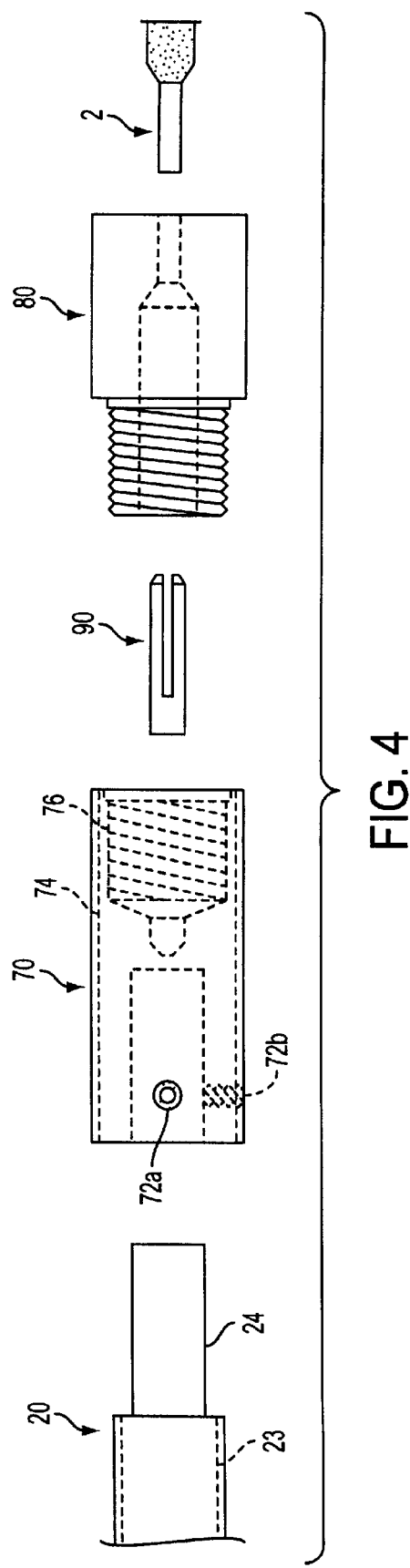
FIG. 4 is an exploded perspective view showing the connection between the collet and the welding rod, the receiver, and the tip.

An embodiment of the welding rod extending assembly 10 is shown in FIG. 1 used in conjunction with a conventional electrode holder 1 and an electrode (or welding rod) 2. Broadly, the welding rod extending assembly 10 comprises an elongated member 20 and a housing portion 60. The elongated member 20 connects at a first end 21 with the electrode holder 1 and at a second end 22 with the housing 60. The elongated member 20 is preferably formed of a lightweight and pliable material so that it can be manipulated to facilitate placement of the welding rod 2 at various angles and positions. Also, the elongated member 20 is preferably made of a material which can be bent and straightened numerous times without breaking it. The bending can be performed manually or with a suitable tool. In a preferred embodiment, the elongated member 20 is a standard #4 solid copper wire of approximately 6 inches to 4 inches in length for standard SMAW applications. The length of the elongated member can be adjusted, depending upon the requirements of the particular application, i.e., the desired distance between the electrode holder 1 and an end 3 of the electrode 2 involved in the welding operation. As shown in FIG. 2a, insulation 23 is provided along substantially the entire length of elongated member 20 between the electrode holder 1 and the housing 60 to prevent accidental arcing. The insulation 23 may be any nonconductive material such as fiberglass or scrap cable insulation. The insulation 23 electrically insulates the elongated member 20. Approximately one inch of length of the elongated member 20 that is in contact with the electrode holder 1 may remain uninsulated. A like portion 24 on the opposite end of the elongated member may remain uninsulated as shown in FIG. 4.

Also as shown in FIG. 1, the housing 60 comprises a receiver 70 and a tip 80. The housing 60 connects at a first end with the elongated member 20 and at a second end with the welding rod 2. In a preferred embodiment of the invention, the entire housing 60 is constructed from brass.

A collet 90 is preferably provided within the housing 60 and extends between the receiver 70 and the tip 80 to grip the electrode 2. Details of the connection between the collet 90, the receiver 70, and the tip 80 are provided below in connection with FIGS. 4–7.

The details of the receiver 70 are further shown in FIG. 2a. The receiver 70 is preferably connected to the elongated member 20 with set screws 72a and 72b. The receiver 70 also includes a threaded aperture 76 in which the collet 90 is disposed. The receiver 70 is preferably surrounded by a temperature resistant insulating material 74, such as a tape, that can be wrapped around the receiver 70. The insulating material 74 electrically insulates the receiver 70.

FIG. 7b shows the tip portion 80 of the housing 60. The tip portion 80 includes an externally threaded opening 82 for receiving the collet 90 and an internal bore 83 for receiving the welding rod 2. The tip 80 is preferably surrounded by a temperature resistant insulating material 84, such as a fiberglass tape or any other nonconductive material, that can be wrapped around the circumference of the tip 80. The insulating material 84 electrically insulates the tip 80.

The collet 90 may have any suitable construction and may be made of any suitable material. For example, the collet may have the construction described in Klasson, U.S. Pat. 4,194,107, incorporated herein by reference for all purposes to the extent it is not inconsistent with this application or invention. In one embodiment, the collet is made of copper.

In one preferred embodiment, substantially the entire outside surface of the receiver 70 and the tip 80 is surrounded by temperature resistant insulating materials 74 and 84, respectively. The materials 74 and 84 may comprise fiberglass or any other nonconductive material. These materials insulate the apparatus in the event that it may inadvertently contact metal objects. Nonetheless, it is also contemplated that only portions of the receiver and the tip can be surrounded by the temperature resistant insulating materials. Furthermore, temperature resistant insulating materials 74 and 84 may be the same or different.

FIG. 4 is an exploded perspective view showing the connections between the elongated member 20, the receiver 70, the collet 90, the tip 80, and the welding rod 2. In operation, one end of the collet 90 is insertable into a borehole in tip 80 and the other end of the collet 90 is received in the aperture 76 of the receiver 70. On a first end, the elongated member 20 has an uninsulated end 24 that attaches to the receiver 70 and on a second end the welding rod 2 attaches to the tip 80.

To facilitate the use of the welding rod extender of the invention with standard electrode holders and welding rods, the component sizes are preferably chosen accordingly. The receiver 70 is preferably between about 1 and about 1 1/4 inches in length and in a preferred embodiment it is 1 1/8 inches in length. The height of the receiver 70 (or diameter, if the receiver is circular in cross-section) is between about 7/16 and about 5/8 inches, and in a preferred embodiment it is 1/2 inches. The tip 80 is preferably between about 1/2 and about 1 inch in length and in a preferred embodiment it is 5/8 inch in length. The height of the tip 80 (or diameter if the tip is circular in cross-section) is about 7/16 to about 5/8 inches, and in a preferred embodiment it is approximately 1/2 inch, and the internal bore 83 for accommodating the welding rod 2 has a diameter necessary to accommodate the welding rod. In one embodiment, the rod has a diameter of approximately 1/3 inch. The threaded opening 89 is preferably 1/2 inch in length and 1/8 inch in diameter. The collet 90 is preferably approximately 13/16 inch in length, has a 1/8 inch inner diameter and a 3/16 inch outer diameter. In a preferred embodiment, 1/2 inch length of the elongated member 20 is inserted into the receiver 70, and 1/2 inch of the length of the collet is inserted into the receiver 70.

In a preferred embodiments each of the housing 60, the receiver 70 and the tip 80 is circular in cross section.

Using the aforementioned preferred dimensions and preferred materials of construction, the weight of the entire assembly is approximately 156 grams or 5.5 ounces.

In operation, the welding rod 2 is secured to the welding rod extending assembly 10 through the interaction of collet 90 and tip 80. FIG. 5 illustrates the movement of the tip 80 and collet 90 upon insertion of the welding rod 2 and FIG. 6 illustrates the movement of the tip 80 and collet 90 upon removal of the welding rod 2. The collet 90 is inserted into the tip 80, and the tip 80 with exposed threads is threaded into the receiver 70. The electrode is inserted into the internal bore 83 as far as possible. As shown in FIG. 5, turning the tip 80 in a first direction causes the collet to tighten around the electrode 2 thereby securing it. As shown in FIG. 6, turning the tip 80 in the opposite direction causes the collet 90 to release its hold on the electrode 2.

Figure 7:
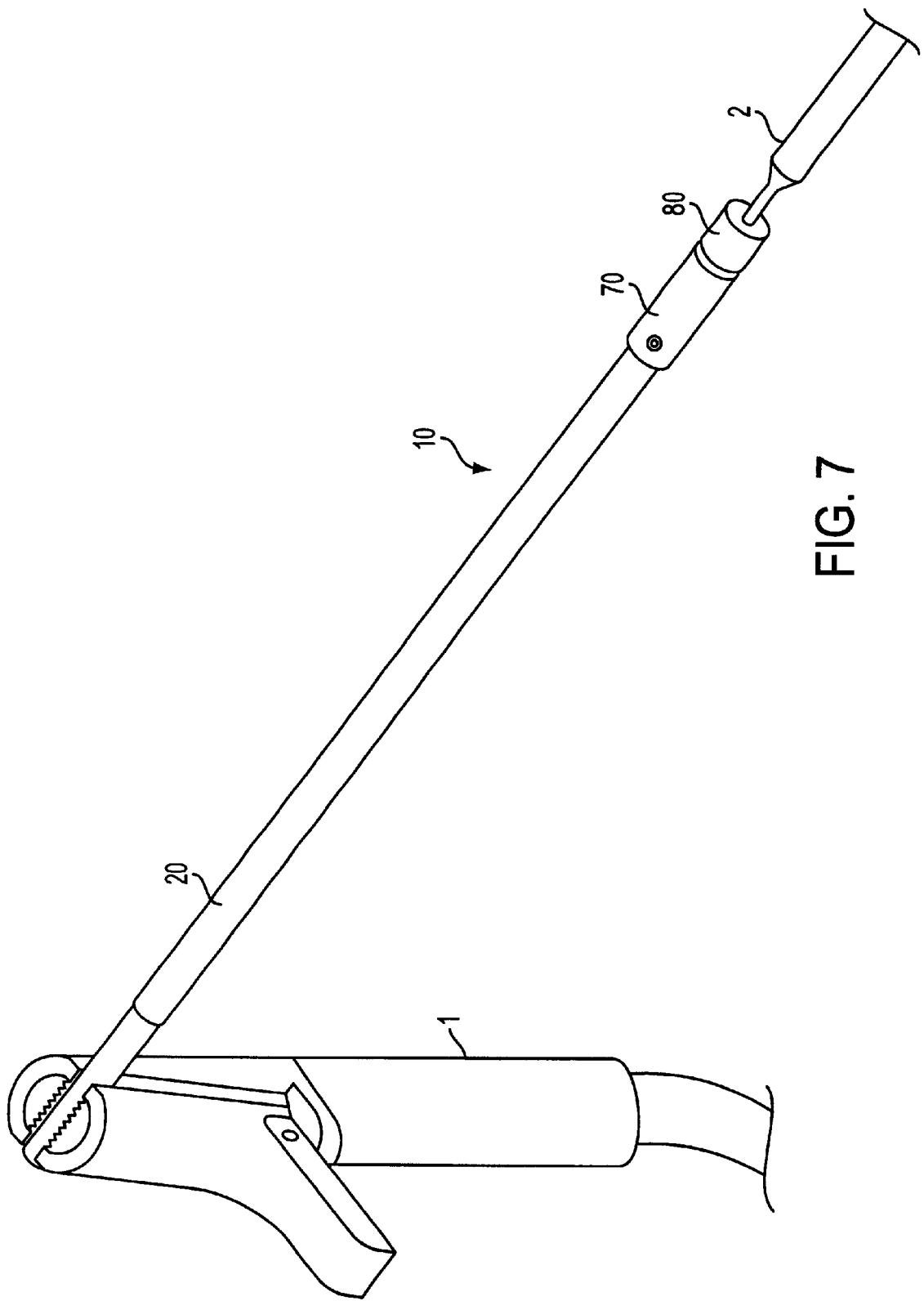
FIG. 7 is a perspective view showing the operation of an embodiment of the welding rod extender of the invention.

FIG. 7 is a perspective view shooting the welding rod extender assembly 10 as used in operation. As shown, the welding rod extender assembly 10 is connected with a standard electrode holder 1 to manipulate the welding rod 2.

Variations of the embodiments described above are possible. For example, although the elongated member 20 in a preferred embodiment is made of copper wire, it is contemplated that it can be made of any other suitable materials. Suitable materials must be electrically conductive and bendable and must be able to hold their shape. Similarly, although the housing 60 which includes the receiver 70 and the tip 80 is made from brass in a preferred embodiment, it can be made from any other suitable material, such as copper. While the shape of the receiver, the housing and the tip is circular in cross section in preferred embodiments, any other suitable shape may be utilized. For example, the housing, the receiver and the tip may be rectangular or square in cross section. Similarly, instead of a plurality of set screws 72a and 72b used to secure the elongated member 20 to the receiver 70, any other suitable means of connecting these two elements may be used. For example, a single set screw may be utilized or any of the following may be used: soldering; brazing; two threaded parts which are screwed together; or at least one pin coupling the elongated member 20 to the receiver 70.

In all embodiments, the electrode holder 1 may have any suitable construction.

Additional advantages and modifications will readily occur to those skilled in the art. Therefore, the invention in its broader aspects is not limited to the specific details in representative devices shown and described herein. Accordingly, various modifications may be made without departing from the spirit and scope of the general inventive concept as defined by the appended claims.

What is claimed is:

1. A welding rod extender for extending an arc welding rod, the welding rod extender comprising:

an elongated member including a first end and a second end, the first end being adapted for connection with an electrode holder;

a receiver having a first connecting end and a second connecting end, the first connecting end shaped for receiving the second end of the elongated member, the second connecting end defining an aperture, the aperture being closed at one end thereof;

a collet disposed in the aperture of the second connecting end of the receiver such that the collet may abut against the closed end of the aperture; and a tip having a first end for connection with the second connecting end of the receiver and an opposite end having an opening shaped for receiving a welding rod, the first end of the tip disposed in the aperture of the second connecting end and the first end of the tip having an opening, the collet disposed in the opening in the first end of the tip.

2. The welding rod extender of claim 1, wherein the collet consists of a single piece.

3. The welding rod extender of claim 2, wherein the collet includes a collet opening adapted to receive a tip of the welding rod .

4. The welding rod extender of claim 3, wherein turning the tip in a first direction relative to the receiver tightens the collet onto the welding rod and turning the tip in a second direction relative to the receiver loosens the collet thereby allowing removal of the welding rod.

5. The welding rod extender of claim 1, wherein the elongated member is formed from copper.

6. The welding rod extender of claim 1, wherein the receiver is formed from brass.

7. The welding rod extender of claim 1, comprising a plurality of set screws securing the receiver to the elongated member.

8. The welding rod extender of claim 1, wherein the tip is formed from brass.

9. The welding rod extender of claim 1, wherein the first end of the tip is externally threaded and the aperture in the second connecting end of the receiver is internally threaded, such that the first end of the tip is threadably received in the second connecting end of the receiver.

10. The welding rod extender of claim 1, wherein the elongated member is constructed of a material such that the elongated member is manually bendable, the elongated member being bendable such that the elongated member may be bent to various desired positions and retain a shape in such various desired positions.

11. The welding rod extender of claim 1, wherein the collet has a length, the aperture in the second connecting end of the receiver receiving a portion of the collet such that at least half the length of the collet is disposed in the aperture in the second connecting end of the receiver.

12. The welding rod extender of claim 1, comprising a temperature resistant insulating material enclosing the receiver and the tip.

13. The welding rod extender of claim 1, comprising an insulating material surrounding the elongated member.

14. The welding rod extender of claim 1, comprising a welding rod in the tip.

15. The welding rod extender of claim 1, wherein the receiver includes a receiver outside surface and the tip includes a tip outside surface, the receiver outside surface and the tip outside surface being substantially parallel to each other.

16. The welding rod extender of claim 15, wherein the receiver outside surface and the tip outside surface each define circumferential outer surfaces, the circumferential outer surfaces being aligned and parallel.

17. A welding rod extender for extending an arc welding rod, the welding rod extender comprising:
- an elongated member having a first end and a second end, the first end being adapted for connection with an electrode holder;
- a collet for holding an end of the welding rod;
- a housing surrounding the collet, the housing being attached to the elongated member at a first housing end, and including a housing tip at a second end; and
- wherein the elongated member is constructed of a material such that the elongated member is manually bendable, the elongated member being bendable such that the elongated member may be bent to various desired positions and retain a shape in such various desired positions.

18. The welding rod extender of claim 17, wherein turning the housing tip in a first direction relative to the first housing end tightens the collet onto the welding rod and turning the housing tip in a second direction relative to the first housing end allows removal of the welding rod.

19. The welding rod extender of claim 17, wherein the elongated member is formed from copper.

20. The welding rod extender of claim 17, wherein the housing is formed from brass.

21. The welding rod extender of claim 17, comprising a plurality of set screws securing the housing to the elongated member.

22. The welding rod extender of claim 17, wherein an end of the housing tip comprises an opening for mating with the collet.

23. The welding rod extender of claim 17, the housing tip including external threads by which the housing tip is threaded onto the first housing end.

24. The welding rod extender of claim 17, comprising a temperature resistant insulating material enclosing the housing.

25. The welding rod extender of claim 17, comprising an insulating material surrounding the elongated member.

26. The welding rod extender of claim 17, wherein the housing comprises a receiver that is separable from the housing tip.

27. The welding rod extender of claim 17, includes a welding rod in the housing tip.

28. A welding rod extender for extending an arc welding rod, the welding rod extender comprising:
- an elongated member having a first end and a second end, the first end being adapted for connection with an electrode holder;
- a housing surrounding a collet, the housing comprising a receiver, a tip and at least one set screw, the elongated member at a first housing end, and including the housing tip at a second end;
- the receiver having a first connecting end and a second connecting end, the first connecting end shaped for receiving the second end of the elongated member, the second connecting end defining an aperture, the aperture being closed at one end thereof;
- the collet disposed in the aperture of the second connecting end of the receiver such that the collet may abut against the closed end of the aperture;
- the tip having a first end for connection with the second connecting end of the receiver and an opposite end having an opening shaped for receiving a welding rod, the first end of the tip disposed in the aperture of the second connecting end and the first end of the tip having an opening, the collet disposed in the opening in the first end of the tip; and
- wherein the elongated member is constructed of a material such that the elongated member is manually bendable, the elongated member being bendable such that the elongated member may be bent to various desired positions and retain a shape in such various desired positions.

29. The welding rod extender of claim 28, wherein the housing consists essentially of the receiver, the tip and the at least one set screw.

* * * * *